United States Patent
Barrett

(10) Patent No.: US 7,968,243 B2
(45) Date of Patent: Jun. 28, 2011

(54) METHOD OF OPERATING A FUEL CELL

(75) Inventor: Scott N. Barrett, Belmont North (AU)

(73) Assignee: Ceramic Fuel Cells Limited, Noble Park (AU)

( * ) Notice: Subject to any disclaimer, the term of this patent is extended or adjusted under 35 U.S.C. 154(b) by 306 days.

(21) Appl. No.: 10/542,198

(22) PCT Filed: Jan. 15, 2004

(86) PCT No.: PCT/AU2004/000052
§ 371 (c)(1), (2), (4) Date: Mar. 2, 2006

(87) PCT Pub. No.: WO2004/064184
PCT Pub. Date: Jul. 29, 2004

(65) Prior Publication Data
US 2006/0147765 A1 Jul. 6, 2006

(30) Foreign Application Priority Data
Jan. 16, 2003 (AU) ............................... 2003900184

(51) Int. Cl.
*H01M 8/04* (2006.01)
(52) U.S. Cl. ......... 429/448; 429/428; 429/443; 429/444
(58) Field of Classification Search .................... 429/13, 429/23, 22
See application file for complete search history.

(56) References Cited

U.S. PATENT DOCUMENTS

| | | | |
|---|---|---|---|
| 4,174,258 A | 11/1979 | Bode | |
| 4,351,182 A * | 9/1982 | Schmidberger | 73/23.31 |
| 5,330,857 A | 7/1994 | Sederquist et al. | |
| 6,428,917 B1 * | 8/2002 | Lacy et al. | 429/13 |
| 6,455,181 B1 | 9/2002 | Hallum | |
| 6,461,751 B1 * | 10/2002 | Boehm et al. | 429/13 |
| 6,730,424 B1 * | 5/2004 | He et al. | 429/13 |
| 2004/0106019 A1 * | 6/2004 | Halliop et al. | 429/13 |

FOREIGN PATENT DOCUMENTS

| | | |
|---|---|---|
| EP | 827226 B1 | 3/2000 |
| WO | WO-02/15295 A2 | 2/2002 |
| WO | WO-02/15309 A2 | 2/2002 |

* cited by examiner

*Primary Examiner* — Patrick Ryan
*Assistant Examiner* — Muhammad Siddiquee
(74) *Attorney, Agent, or Firm* — Birch, Stewart, Kolasch & Birch, LLP

(57) ABSTRACT

A method of operating a fuel cell (1) in which a gaseous supply stream (5) comprising a reactive species is delivered to an electrode (2) where the reactive species is consumed in an electrochemical reaction to produce an exhaust stream (7, 8) which is depleted in reactive species, which method comprises: a) assessing the concentration of reactive species in the exhaust stream (7, 8); b) relating the concentration of reactive species in the exhaust stream (7, 9) to a maximum current that may be drawn from the fuel cell (1) without redox damage of the electrode; and c) adjusting the way in which the fuel cell (1) is operated in order to optimize efficiency without redox damage of the electrode (2).

7 Claims, 5 Drawing Sheets

Figure 1:
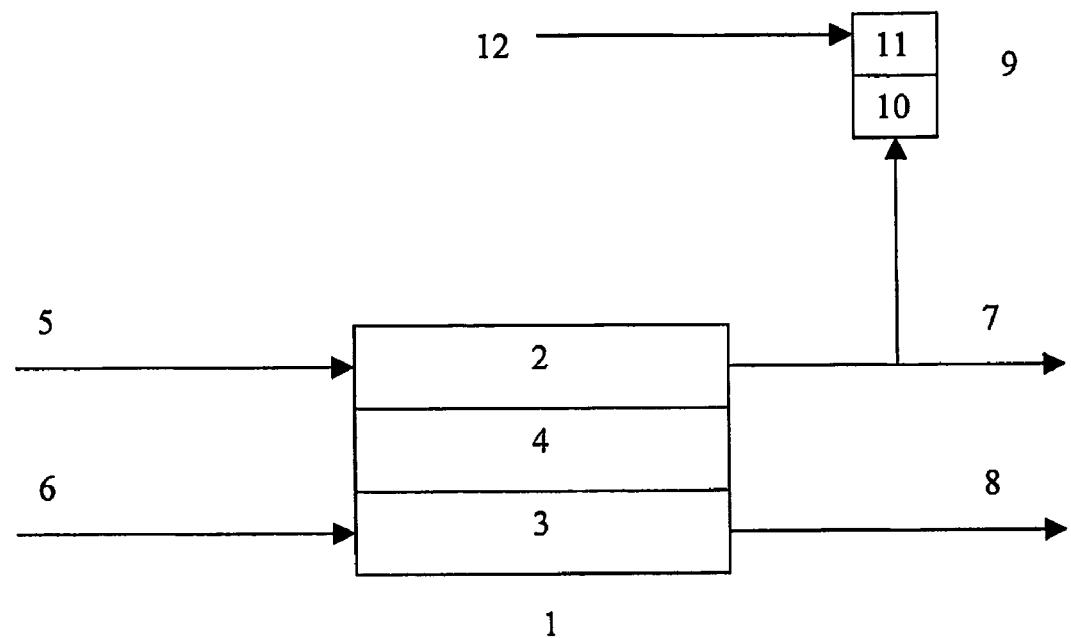

1 - H$_2$ exhaust;  2 - Air exhaust;  3 - Alumina bottom end plate;  4 - H$_2$ inlet;

METHOD OF OPERATING A FUEL CELL

The present invention relates to a method of operating a fuel cell and to a fuel cell system. The invention is particularly concerned with optimising efficiency of a fuel cell whilst preventing redox damage of the electrodes of the cell.

Fuel cells convert gaseous fuels (such as hydrogen, natural gas and gasified coal) via an electrochemical process directly into electricity. A fuel cell continuously produces power when supplied with fuel and oxidant, normally air. A typical fuel cell consists of an electrolyte (ionic conductor, $H^+$, $O^{2-}$, $CO_3^{2-}$ etc.) in contact with two electrodes (mainly electronic conductors). On shorting the cell through an external load, fuel oxidises at the anode resulting in the release of electrons which flow through the external load and reduction of oxygen at the cathode. The charge flow in the external circuit is balanced by ionic current flow within the electrolyte. Thus, at the cathode, oxygen from the oxidant is dissociated and converted to oxygen ions which migrate through the electrolyte and react with reactive species in the fuel at the anode/electrolyte interface. Fuel remaining at the anode is therefore depleted in reactive species, the extent of depletion in comparison to the fuel supplied being a measure of the fuel utilisation of the cell. If the concentration of reactive species in the fuel remaining at the anode is insufficient, the migrating oxygen ions will react with the anode itself causing oxidative degradation and damage. Similarly, if the concentration of oxidant at the cathode is insufficient relative to the availability of electrons at the cathode/electrolyte interface, the energy potential will cause reduction of the cathode. Such redox damage of the electrodes is undesirable.

Attempts to control anode damage are known. One such method involves limiting the operating voltage of the fuel cell(s). This operating voltage limit is selected with a knowledge of the fuel flow supplied to the cell(s) and the voltage losses are known or pre-characterised for a given fuel cell current. Maintenance of the operating voltage above this predetermined threshold is used to prevent the current draw exceeding that which will cause anode oxidation. The cell(s) are pre-characterised by analysis of the voltage losses over the operating current range in comparison to the voltage observed at open circuit. Analysis is performed to attribute voltage losses to the concentration gradient of fuel and air through the electrodes and the electrical resistance of the totality of cells.

Another method is based on measurement of fuel cell utilisation. This involves measurement of fuel cell (stack) current and fuel flow and relies on determining the volumetric fuel flow to the fuel cell. The allowable current draw from the cell(s) can then be calculated to achieve a suitable fuel utilisation without anode damage. However, a problem with this is that fuel utilisation measured in this way has less meaning as the catalytic activity of the cell components changes due to ageing. Also, a cell that exhibits methane slippage will operate at a higher actual fuel utilisation than predicted and the measured fuel flow is then not a measure of (reformed) fuel available to the cell. A similar effect is observed if there is fuel leakage from the system. In these cases part of the measured fuel flow is not actually in a form that has the ability to contribute to the generation of electrical power.

It is also known to detect oxidation damage of a carbonaceous anode of a fuel cell (e.g. a phosphoric acid fuel cell) by comparing the levels of carbon monoxide or carbon dioxide in anode feed and exhaust streams. Any abnormality in the concentration of carbonaceous gas species in the anode exhaust stream is indicative of anode oxidation, thereby enabling the cell to be shut down without further damage. Whilst useful, this system relies on anode oxidation actually occurring before detection is possible, and it is not suited to avoiding oxidation on a continuous basis during cell operation.

It would be desirable to provide a means for avoiding electrode damage during operation of a fuel cell without reference to current drawn from the cell or to mass flow measurement. This would allow the risk of electrode damage to be managed over the cell turndown range and throughout the lifetime of the cell, regardless of operating condition. It would also be desirable to provide a means for avoiding electrode damage before it occurs and on a continuous basis and in response to fluctuations in cell operating conditions.

Accordingly, the present invention provides a method of operating a fuel cell in which a gaseous supply stream comprising a reactive species is delivered to an electrode where the reactive species is consumed in an electrochemical reaction to produce an exhaust stream which is depleted in reactive species, which method comprises:
a) assessing the concentration of reactive species in the exhaust stream;
b) relating the concentration of reactive species in the exhaust stream to a maximum current that may be drawn from the fuel cell without redox damage of the electrode; and
c) adjusting the way in which the fuel cell is operated in order to optimise efficiency without redox damage of the electrode.

Herein the term "redox damage" is intended to mean damage due to a change in the redox state of the electrode as used in a fuel cell. The anode is used in a reduced state and the cathode in an oxidised state. The term thus embraces damage of the anode due to oxidation and/or damage of the cathode due to reduction. The term "fuel cell" embraces a stack of individual fuel cells, as is typically used in a fuel cell system.

In practice, operation of a fuel cell involves delivery of a gaseous supply stream comprising reactive fuel species to the anode, or delivery of a gaseous supply stream capable of generating reactive fuel species at the anode, for instance by a (methane) reforming reaction at the anode. A gaseous supply stream comprising reactive oxidant species is delivered to the cathode. In the method of the invention the first step involves an assessment of the concentration of one or both of these reactive species in the respective electrode exhaust stream. The method subsequently involves relating the concentration of reactive species in the electrode exhaust stream to the maximum current that may be drawn without redox damage of the electrode. This may be done by predetermination of the relationship between the concentration of reactive species in the relevant electrode exhaust stream and the maximum current which may be drawn without electrode damage. This assessment can then be used to determine the utilisation of reactive species at one or both electrodes and may be used as a control for how the fuel cell is operated in order to optimise efficiency and avoid electrode damage.

In a preferred embodiment of the invention, the method involves sampling the anode exhaust stream and assessing the fuel quality thereof. The fuel quality of the anode exhaust stream is a measure of its potential to react with oxygen ions available at anode/electrolyte interface. In other words the fuel quality is a measure of the content of reactive fuel species in the anode exhaust stream. For a given current draw, if the fuel quality of the anode exhaust stream is inadequate, there will be insufficient reactive fuel species at the anode/electrolyte interface to react with the oxygen ions transported to the anode through the electrolyte due to the current being drawn. In that case the oxygen ions will react with the anode thereby causing oxidation damage. To avoid oxidation damage it is then necessary to adjust operation of the fuel cell to reduce the rate of migration of oxygen ions to the anode. This may be done by reducing the current drawn from the cell and/or by enhancing the fuel quality of the anode exhaust stream thereby increasing the concentration of reactive fuel species available for reaction with oxygen ions. Under steady state operating conditions, the current draw is essentially fixed. In that case, and assuming a fixed composition for the fuel supply stream, the fuel quality of the anode exhaust stream may be adjusted by increasing the rate of flow of the fuel supply stream to the anode. The same effect may be achieved without adjusting the rate of fuel supply by increasing the concentration of reactive fuel species available to the anode. The rate of supply of the oxidant may also be adjusted in the same manner to ensure the safe and efficient operation of the cathode.

If the fuel quality of the anode exhaust stream is too high, there is an excess of reactive fuel species. In this case, the fuel utilisation is not optimised since there is scope for more current to be drawn from the cell. Assuming a fixed composition for the fuel supply stream, efficiency may be enhanced by either reducing the fuel quality of the anode exhaust stream (by increasing the current drawn) and/or by reducing the fuel supply flow rate. Variation in inlet gas quality may also change the concentration of reactive fuel species available to the anode. The fuel cell fuel utilisation may thus be regulated by knowledge of the composition of electrode exhaust gases, the prevailing operating conditions and gas supply compositions.

In this embodiment the crux of the invention resides in using the fuel quality of the anode exhaust stream as an indicator of anode oxidation risk in order to control suitable current draw and/or the fuel supply (rate or composition). This enables operation of the fuel cell to be optimised within safe operating limits while avoiding conservative margins of safety. As this invention may be used to relate electrode exhaust quality and current draw, control of the fuel utilisation may also be used as a means of meeting the thermal requirements of the cell system for any given operational state. This said, the fuel utilisation limit of a fuel cell stack design may set a threshold value, but is not the sole factor to target operating point for a fuel cell system. System considerations, such as maximum power output, point of best efficiency, thermal self-sustenance and stability of ingoing composition due to steam generation, set the target fuel utilisation according to the system design choices and the immediate operating conditions.

In another embodiment the method involves sampling the cathode exhaust stream and assessing the oxidant quality thereof by comparing its oxygen partial pressure to that of a reference gas. The oxidant quality of the cathode exhaust stream is a measure of its potential to react with electrons available at the cathode/electrolyte interface. For a given current draw, if the oxidant quality of the cathode exhaust stream is inadequate, cell voltage and therefore output power will be degraded. Furthermore, there will be insufficient oxygen available relative to electrons transported. In this case, there is a risk of reduction of the cathode causing irreversible damage. This may be remedied as described above, by changes of oxidant flow rate and current draw. If the oxidant quality of the cathode exhaust stream is too high, there will be an excess parasitic loss to the system due to the pumping power required to deliver high oxidant flow rate which is not recovered by the increase in cell voltage (the voltage increase is caused by the abundant oxygen supply). This may be remedied by the control measures described above in connection with superfluous fuel quality in the anode exhaust stream.

The oxidant supply may be sufficiently low to warrant control of the oxidant utilisation such that power is maximised by trade off of oxidant mass flow rate (effecting) voltage and parasitic losses to the system according to pumping losses in supplying the oxidant mass flow. Utilisation of the oxidant has typically been of little consequence in solid oxide fuel cell systems as air (the oxidant) is cheap to obtain and has been required in quantities far in excess of stoichiometry. This is required for cooling of the fuel cell stack. Low stoichiometric ratios may be achieved when the system is required to output only small amounts of power and active heat rejection is not required. Low stoichiometric ratios are also applicable in fuel cell systems where the oxidant does not provide the main means of cooling.

The fuel quality of the anode exhaust stream may be considered as being a measure of the oxygen partial pressure at the anode. A low oxygen partial pressure implies high fuel quality, and vice versa. The oxidant quality of the cathode exhaust stream may also be considered as being a measure of the oxygen partial pressure at the cathode. Measurement of the oxygen partial pressure of an electrode exhaust stream therefore affords a convenient way of implying the quality (in terms of reactive species) of an exhaust stream, and this measurement may be used in controlling how a fuel cell is operated to achieve optimum utilisation of feed(s) without redox damage of the electrodes. Typically, therefore, the first step of the present invention involves using an oxygen sensor to measure the oxygen partial pressure of an electrode exhaust stream, as a way of assessing the concentration of reactive species in the stream.

In general terms the quality (in terms of content of reactive species) of an electrode exhaust stream may be determined by measuring the Nernst voltage of an oxygen sensor in which a reference electrode is exposed to a reference gas and a working electrode to the exhaust stream being sampled. Measurement of the open cell voltage (OCV) and of the temperature of the sensor electrolyte allows the quality of the electrode exhaust stream to be determined. Oxidation of the anode is known to occur over an oxygen partial pressure range of $1 \times 10^{-16}$ to $1 \times 10^{-12}$ in the typical operational temperature range of a solid oxide fuel cell. Likewise, reduction of the cathode of a solid oxide fuel cell occurs at a low oxygen partial pressure, typically $<10^{-10}$. In both cases the present invention involves measurement of oxygen partial pressure and making allowances for the variation of the mass transport of gasses within the electrode structure and variation of those properties with current density. Conventional oxygen sensors may be used in practice of the present invention, and one skilled in the art would be familiar with their operation. Useful oxygen sensors are commercially available and may be included into a fuel cell stack or into the plumbing of the manifolds or balance of the system. A sensor may be readily constructed by a solid oxide fuel cell manufacturer as a part of the fuel cell stack.

The reference gas is of known composition and a number of different gases may be used. Preferably, air is used as it has essentially constant composition and is typically in abundant supply as a pressurised fluid in a fuel cell system. The reference gas is in an unused state and is provided fresh to the reference electrode of the sensor. When assessing fuel quality, the reference gas supplied to the oxygen sensor may be air or reformed inlet fuel.

Reformed fuel is useful as a reference gas to provide a measure of the fuel utilisation of the stack as then the ingoing fuel quality is being compared to that of the outgoing fuel quality. The reformation may be compensated for variation from equilibrium. This can be useful in a system that supplies fuel to the stack of varying quality, for example, from an autothermal reformer or partial oxidation reactor or due to fluctuations in flow and quality due to the output of a steam generator. When the fuel is supplied in a transient condition, a reduction in the fuel quality supplied to the stack may be pre-empted by a reduction in the oxygen partial pressure difference between the two streams (in the absence of a change in load condition or fuel flow rate). In this way instabilities upstream of the stack may be detected and action taken to put the system into a stable condition or to ease utilisation targets for the stack in order to increase the margin for safety against oxidation damage.

No current is drawn using the reference gas, other than for the purpose of measuring voltage. The temperature of the sensor electrolyte may be measured by conventional means, such as by thermocouple or implied from characterisation of AC impedance with temperature.

The relationship between fuel and/or oxidant quality and maximum current draw without risk of redox damage may be established by experimental testing for a given fuel cell system. This relationship changes according to utilisation of reactive species and the diffusion overpotential (characterised as a function of current drawn, quality of reactive species and fuel flow rate, as measured by experiment), and one embodiment of the invention takes the diffusion overpotential into account to provide more accurate fuel cell control.

Oxidation of the anode may be assessed by maintaining excess air flow and observation of a long time constant in GCI tests or by increased electrical resistance of the electrode or decreased catalytic activity. When the same exhaust fuel quality that causes damage for that current draw is approached in practice, the current drawn and/or fuel supply may be adjusted appropriately to avoid damage.

As per with the anode, cathode degradation (by reduction instead of oxidation) may be observed as an increase in overpotential of the cell. Typically, fuel cell systems are operated at a stoichiometric ratio that ensures that air utilisation is substantially lower than that of the fuel. Therefore if the fuel utilisation is acceptable, it is likely that the air utilisation will not be a limitation and it will not be necessary to limit the operational power of the system. It is conceivable that a fuel cell system may be designed such that the air utilisation is required to be measured as the stoichiometric ratio is low.

Fuel utilisation may be indicated for a stack by the use of a sensor as described herein, the advantage being that to achieve an indication of fuel utilisation of the stack, the fuel supplied to the stack need not be measured by means of flow measurement.

The fuel utilisation may be tracked over a long time constant. Coupled with a knowledge of the current drawn from the stack, the limits of fuel utilisation may be taken to the limits in the short term by monitoring the voltage response of the stack. The voltage limit can be dynamically set as a function of current and the reactant utilisation. This may be characterised from steady state operation. The current at which a particular voltage is measured follows a relation with the instantaneous utilisation. The shift in the voltage vs current relationship (VI) is used in this way to provide corrections for the voltage limit according to the observed shift in utilisation that caused the VI shift. Alternatively, variation of fuel flow may add a small correction for the voltage limit.

This voltage limiting strategy may be important if there is a delay in the response of the sensor due to transport of fuel to the sensor and as gas composition changes with delay due to dilution effects during transient operating conditions. This strategy is not effected by variation of stack voltage due to stack degradation mechanisms, because it is performed in the short term with reference to the data collected in the previous period of steady state operation. By use of this strategy, the stack performance may also be determined as there is utilisation measurement, current measurement and voltage measurement. From these indicators, the overpotentials may be characterised over the power output range of the stack throughout its life.

In an embodiment of the present invention the inlet and exhaust streams associated with a fuel cell stack are referenced directly to one another in an oxygen sensor. The Nernst voltage of the sensor may then be used to give an indication of utilisation of reactive species at the electrode. In this embodiment the fuel and/or oxidant quality of relevant exhaust stream may also be determined from prior knowledge of the inlet fuel and/or oxidant gas quality.

Alternatively, the inlet and exhaust streams may be referenced individually to separately provided reference gasses and the oxygen partial pressures of the samples measured. Measurement and comparison of the oxygen partial pressures of the inlet and outlet streams enables the utilisation of reactive species to be determined without reference to any flow rates or current drawn.

In a preferred embodiment the invention involves the calculation of the quality of reactive species at the relevant electrode-electrolyte fluid interface (the triple point gas quality) thereby factoring in cell electrode gas composition gradients due to the current density and mass transport properties of the electrode and the gas supplied to it. This effect is called the polarisation overpotential. In this embodiment the polarisation overpotential is calculated and used as an input for the current limiting control loop to set the maximum allowable fuel utilisation for any particular current density and gas quality available to the electrode. This is performed by reference to prior characterisation of the mass transport properties of the electrode over all of the operating range of gas quality available to the electrode and current density. Experimental characterisation is only applicable to the particular design of cell system being used. There are effects of flow distribution through the fuel cell stack that will change due to the thermal gradients that exist within the stack. The gradients are dynamic according to the operating condition, thermal insulation and thermal mass of the stack. It is beneficial to measure temperature gradient in a stack during operation such that the errors in flow distribution may be estimated and the margins for fuel utilisation be dynamically calculated. This strategy may be particularly useful as ageing effects on reforming action and electrical resistivity may be difficult to predict differentially within the fuel cell stack as it changes over time. The greater the flow distribution errors described above, the greater the quality of the exhausting reactive gasses must be for that fuel cell stack to cater for the needs of the cells operating at the lowest flow rates and therefore the highest reactant utilisations.

Characterisation may be performed by one skilled in the art by using the following standard analytical tools:
  Voltage Current curves for cells, stacks and cells within stacks. This would be performed at various reactant utilisations and separating the mass transport over potentials of both electrodes.
  Alternating Current Impedance Spectroscopy
  Galvanostatic Current Interruption
  Gas Chromatography analysis of inlet and exhaust gasses.

The intent being to establish relationships between electrical current, fuel cell stack exhaust gas quality(s) and stack thermal profile to define the limits of destructive operation.

Another embodiment involves measurement of the fuel mass flow, and electrode fluid quality at both inlet and outlet.

From this the utilisation may be calculated and the gas quality on the electrode measured. By either method this may then be used as input into the calculation for triple point gas quality.

Preferably the gas utilisation is used as a measure of gas quality limitations, as it allows for the variation of the oxidation limits for the oxygen partial pressure as it varies with temperature. A further refinement of the invention involves monitoring the oxygen partial pressure in the electrode fluid spaces and controlling fuel and oxidant flow rates and current draw to maintain the desired oxygen partial pressure on both of the electrodes. This involves the maintenance of a suitably low oxygen partial pressure on the fuel electrode to avoid oxidation and maintaining a suitably high oxygen partial pressure on the oxidant electrode to avoid reduction of the oxidant side electrode and maintain efficient operating voltages (with some regard for consequent pumping losses as they increase with airflow rate, the cost of fuel and the heat requirements of the system).

Accordingly, in a preferred embodiment the present invention provides a method of operating a fuel cell in which a fuel supply stream is delivered to an anode where reactive fuel species are consumed in an electrochemical reaction to produce an anode exhaust stream having a fuel quality, and an oxidant supply stream is delivered to a cathode where reactive oxidant species are consumed in an electrochemical reaction to produce a cathode exhaust stream having an oxidant quality, which method comprises:
a) assessing the fuel quality of the anode exhaust stream;
b) assessing the oxidant quality of the oxidant exhaust stream;
c) calculating the electrode triple point gas quality;
d) relating the fuel quality of the anode exhaust stream to the maximum current which may be drawn from the fuel cell without oxidation damage of the anode of the fuel cell;
e) relating the oxidant quality of the oxidant exhaust stream to the optimal depletion level according to voltage effects on the fuel cell stack and parasitic pumping losses in provision of oxidant supply and maintaining a safety margin from the maximum current which may be drawn from the fuel cell without reduction damage of the oxidant electrode of the fuel cell;
f) adjusting the current drawn from the fuel cell and/or adjusting the fuel supply stream flow rate in order to optimise efficiency of the fuel cell without oxidation of the anode of the fuel cell; and/or
g) adjusting the current drawn from the fuel cell stack and/or adjusting the oxidant supply stream in order to optimise efficiency of the fuel cell without reduction of the of the oxidant side electrode.

During periods of transient power demand from the system, it may be of advantage to reference the stack voltage derivative. It is advantageous to use feed forward control to adjust the reactant flow rates. In this way fuel flow, for example, may be ramped up on the call for more power and in anticipation that the stack will be consuming more fuel and air without having actually sensed it. Likewise, on load rejection, it is important that fuel flow is reduced without delay to minimise the load on the heat recovery parts of the fuel cell system.

By use of this invention, operation of the fuel cell may be controlled without the difficulties associated with mass flow measurement, as the exhaust gas quality is measured and related to the current to ensure operation within the characterised limitations of gas utilisation for the immediate operating condition. A further advantage associated with the present invention is that the method is unaffected by changes in the electrical resistance of a fuel cell (stack) over time. Furthermore, the method is applicable irrespective of the nature of the electrode supply streams as it is the quality of the exhaust streams which in conjunction with known mass transport properties of the electrode, under various current densities, which is representative of oxidation or reduction risk of the fuel or oxidant electrode respectively. The method is not effected by the electrode gas quality on the other side of the electrode (as occurs with setting cell voltage thresholds) and the consequent effect that it has as a contributor to changes in cell voltage during operation. An implication of the present invention is that such things as steam to carbon ratio or fuel dilution by other mechanisms which would otherwise effect utilisation calculations from fluid flow measurement do not effect the method described herein. However, a safety margin in target oxygen partial pressure may be applied to account for, for instance, variations in steam flow rate. This may be employed where inlet gas quality is not sensed and the margin is provided to allow for transients of composition that will effect the cells before it is sensed at the exhaust. Alternatively the margin may be provided on top of the active cell voltage with a dynamically calculated voltage limit. The present invention also provides a fuel cell system configured to make use of the method of the present invention.

The sensor used to measure the fuel quality of the anode exhaust stream may be external to the fuel cell or stack and reference the anode exhaust stream within the gas distribution plenums, manifolding or piping. Alternatively, the sensor may be integrated within the stack, for example as an isolated segment on an active layer that samples gas either from that layer or, samples gas that is representative of the average stack exhaust composition. Direct measurement of anode exhaust quality within the stack is desirable as it would provide rapid response to the current draw and/or fuel supply loops it feeds into. When the sensor is a Nernst voltage device within a stack of fuel cells, the sensor may be provided with a layer of reforming catalyst on the electrode of one or more surfaces and gas passages arranged to transport anode inlet and exhaust stream. When a reforming electrode is provided it gives an indication of the potential fuel quality if the cell were to convert it for consumption. In this way the sensor may be used to determine the catalytic health of the fuel cell.

Embodiments of the present invention are illustrated in the accompanying figures.

FIG. 1 is a schematic showing a fuel cell (1) comprising an anode (2), cathode (3) and a solid electrolyte (4). The anode (2) is supplied with a gaseous fuel supply stream (5) comprising reactive fuel species and the cathode (3) with a gaseous oxidant fuel supply stream (6) comprising reactive oxidant species. During operation of the cell (1) the reactive species are consumed in an electrochemical reaction resulting in anode and cathode exhaust streams (7, 8) which are depleted in respective reactive species. In the embodiment shown the concentration of reactive fuel species in the anode exhaust stream (7) is assessed using a sensor (9) in which the sensor electrodes (10, 11) are exposed to anode exhaust stream (7) and air (12) respectively. In this case air is used as the reference gas. The relationship between the concentration of reactive fuel species in the anode exhaust stream (7) and the maximum current which may be drawn from the fuel cell (1) is predetermined thereby enabling operation of the cell (1) to be adjusted to optimise efficiency without redox damage of the electrodes (2,3).

Figure 2:
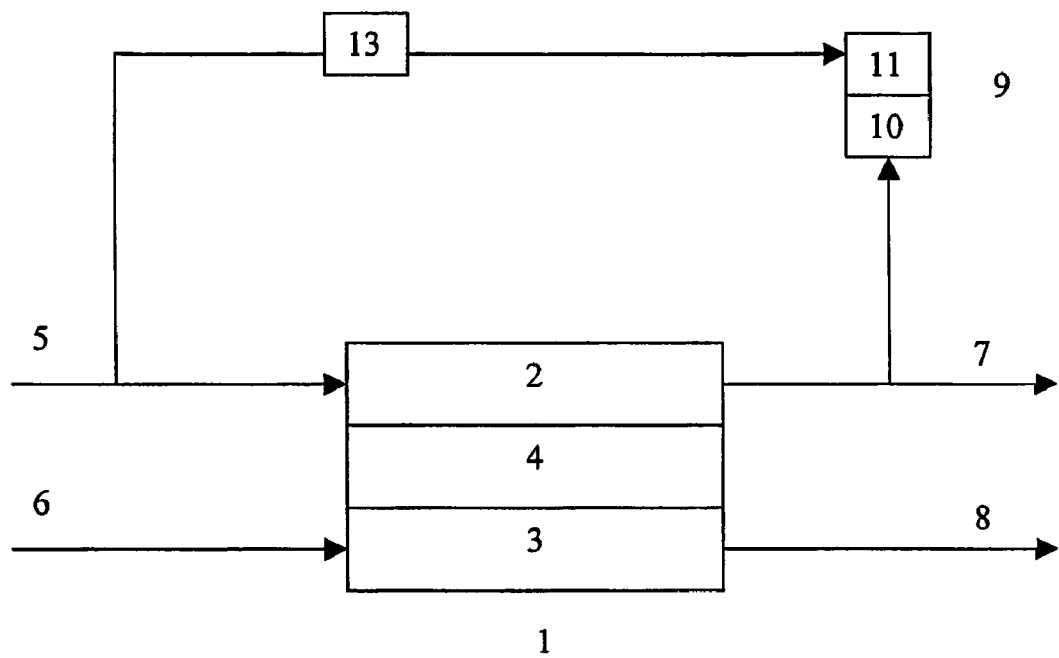

FIG. 2 illustrates essentially the same arrangement as FIG. 1 but in this case the reference gas to the sensor (9) is not air but reformed fuel which has been processed by an equilibrium reformer (13) from the gaseous anode supply stream (5).

Figure 3:
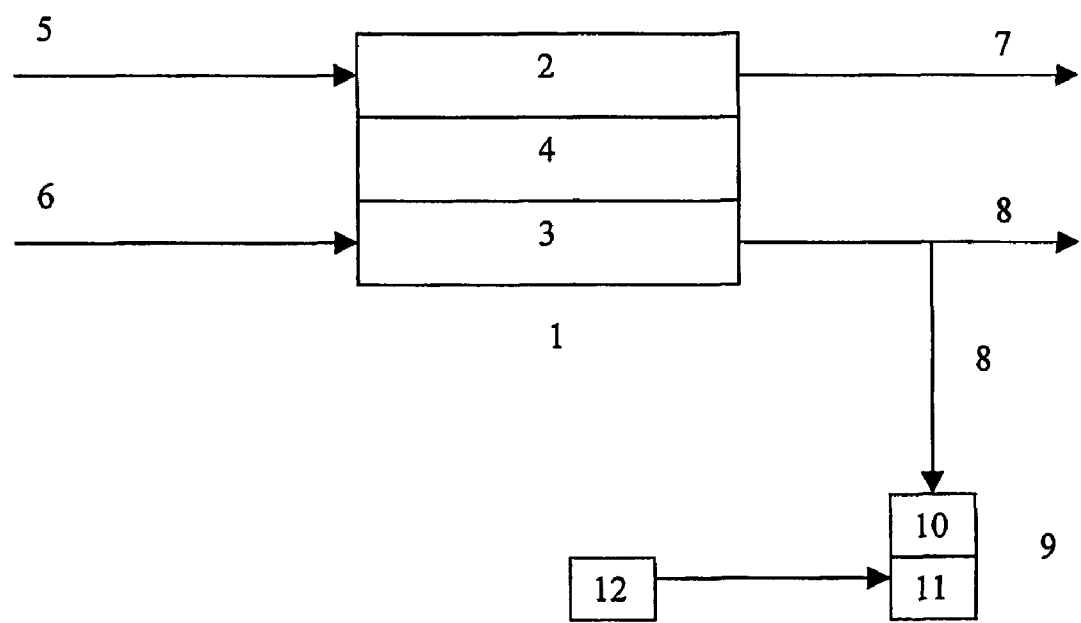

In FIG. 3 the concentration of reactive oxidant species in the cathode exhaust stream (8) is assessed using a sensor (9)

in which one electrode (10) is supplied with cathode exhaust stream (8) with air (12) being supplied to the other electrode (11) as reference gas. The relationship between the concentration of reactive oxidant species in the cathode exhaust stream (8) and the operating characteristics of the cell (1) are predetermined so that the sensor (9) output may be used as a control for the way in which the cell (1) is operated to achieve maximised efficiency.

Figure 4:
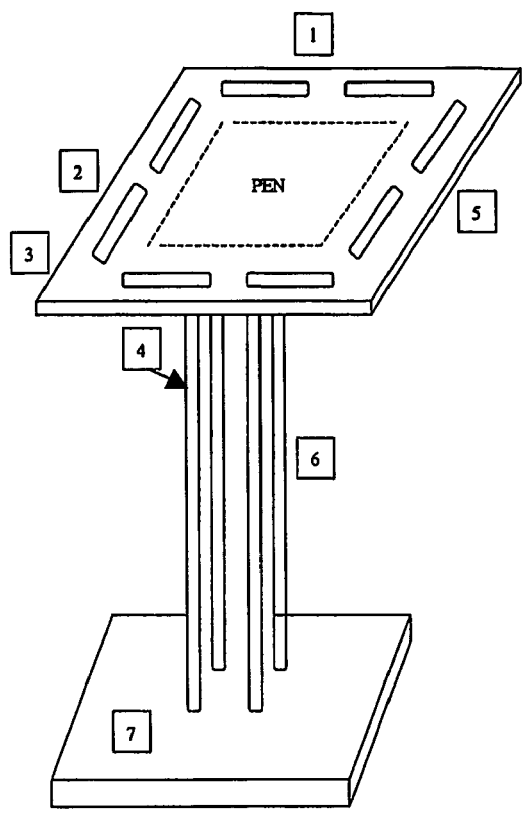

FIG. 4 illustrates a fuel cell which is mounted on an alumina test stand.

Figure 5:
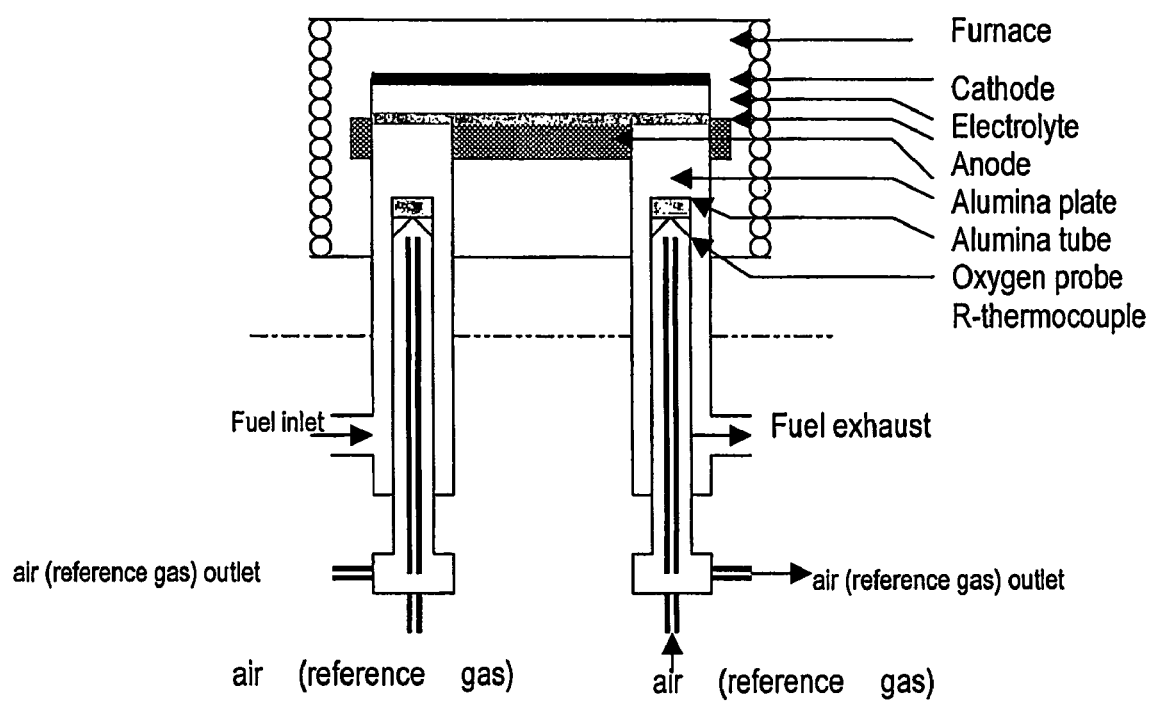

FIG. 5 schematically illustrates the arrangement of a fuel cell and an oxygen probe.

The examples shown in the figures indicate gas transport to the electrodes. This may be performed by short diffusion lengths or may include pumped supply with exhaust plumbing to appropriate locations within the fuel cell system.

EXAMPLE

Application of Zirconia Oxygen Probes for Fuel Utilisation Measurements

A solid oxide fuel cell consisting of a solid electrolyte made of 3YSZ (90 mm×110 mm and 94±10 um), a Ni-cermet anode (thickness: 57±10 μm) with a Ni-grid (Ni grid; 64±20 μm) and a LSM cathode (61±10 μm) with Ag-grid (102±20 μm) was tested in $H_2$ with 4, 10, 20 and 40% water at 850° C. under constant current. Air was used on the cathode side. The cell was mounted on an alumina test stand as illustrated in FIG. 4. The current was collected by Ni-pressure layer on the anode side and Ag-expanded mesh on the cathode side. Glass-ceramic seals were used to restrict the air and fuel to the cathode and anode and also to prevent any cross mixing. 60N force was applied on the fuel cell stack to ensure proper contact with the current collectors. The air and hydrogen flow rates were controlled by mass flow controllers which were calibrated for the respective gases. A humidifier filled with distilled water was used to humidify the hydrogen. The water temperature was controlled to the desired temperature with the help of a temperature controller.

Zirconia oxygen probes were used to measure oxygen partial pressure in the fuel inlet and exhaust streams. The probes were obtained from Novatech Controls Pty. Ltd. of Australia. Highly porous Pt paste was used as electrodes on both sides of the zirconia pellet. The open side of the probe was used for sensing oxygen content in the fuel with respect to air on the sealed side. The difference in the oxygen partial pressure between the two sides appeared as a voltage which was measured by means of two Pt probes attached to the two sides. The temperature of the probe was measured by an R-type thermocouple attached to the air side reference. Given the inlet gas composition is known, then the temperature and voltage across the probe in the fuel exhaust is used to give indication of the fuel utilisation. The fuel utilisation thus calculated was compared with fuel utilisation calculated from stack current and hydrogen flow rate.

The fuel cell stack was operated at 20%, 25% and 30% fuel utilisation at 4% inlet water content. At water contents equal to 10%, 20% and 40%, the utilisation was reduced 15%. The fuel utilisation chosen was obtained from hydrogen flow rate and operating current. The fuel inlet and exhaust oxygen sensors measured the oxygen partial pressure for the different fuel compositions used. The fuel exhaust sensor was found to be sensitive to the fuel exhaust gas composition which in turn depended on the operating current, hydrogen flow rate and the humidity level of the fuel.

The results obtained showed a good correlation between the two methods of determining fuel utilisation. As an example, a fuel utilisation of 22% was calculated from the oxygen probe output in the exhaust fuel. The inlet humidification level was 5.12% as calculated directly from the temperature of the water. The conventional method gave a fuel utilisation figure of 20% for a hydrogen flow rate of 279 mSLM and a current of 8 A that was applied. The percentage of error between the two methods differed depending on the fuel utilisation chosen and inlet humidification level used.

The estimation from the oxygen probe output gave 10-13% higher figures in the case of low humidity levels of 5-6%. The difference increased to 16 and 17% for humidification levels of 24% and 13%. The difference in the estimation from the two methods reduced to <1% at humidification levels of 48%.

Errors may be introduced during this test due to bottled fuel mass flow rate, current measurement, leaks, humidification and therefore the implied inlet fuel composition. In this experiment the inlet fuel composition is not measured by oxygen probe, but is implied from the bottled gas composition and $H_2O$ contribution according to the measured humidifier temperature. Error in estimated inlet composition then offsets the outlet composition, appearing as a discrepancy in this experiment. As composition of the anode exhaust is to be a function that is controlled to (and not strictly a fuel flow and current relationship) this measurement offers much more useful analysis of operating condition of the fuel cell stack whilst on line, than by other technique.

Test Articles:
1) PEN (Positive-Electrolyte-Negative)

The PEN used for the fuel cell test comprised of a solid electrolyte (3YSZ, 94±10 μm) and 110 mm by 90 mm in size. Ni mixed with YSZ was screen printed on one side to (thickness of 57 μm) and was fired to a temperature of 1400° C. for 2 hours to form the anode (100 mm×80 mm). LSM was screen printed on the reverse side (thickness=61 μm) and was fired to 1150° C. for 2 to form the cathode (100 mm×80 mm).

2) Oxygen Probes:

Novatech oxygen probes (Model 1232) are used. The probes are zirconia oxygen sensors coated with conducting Pt paste on both sides. The sensor was fixed to one end of an alumina tube of 8 mm OD and 170 mm long. An R-type thermocouple was used to measure the temperature on the air side reference.

The specifications given by the oxygen probe manufacturer are given below:

| | |
|---|---|
| Applications: | Combustion flue gases above 700° C. with no contaminants e.g. natural gas, light oils |
| Temperature Range: | 700-1400° C. |
| Length: | 500-1500 mm |
| Process Connection: | ¾" BSP or NPT |
| Sheath OD: | 19 mm |
| Heater: | No |
| Flue Gas Thermocouple: | R, integral |
| Response Time: | Typically <1 sec |
| Head Temperature: | 150° C. Max |
| Reference Gas: | Air |
| Calib'n Check Gas Flow: | 10 to 500 cc/minute |
| Ref. Air Connection: | Integral air line in probe cable. |
| Particulate Filter (optional): | Not required |
| Calib'n Check Gas Connection: | ⅛" NPT female |
| Weight: | 0.1 kg/100 mm length. |

FIG. 5 illustrates schematically the arrangement of fuel cell and the oxygen probe. Thus, the oxygen probe is inserted into the hollow portion of the hydrogen exhaust port of the test stand. The hydrogen enters from side and also exits from side. The section of the copper tubing carrying hydrogen to the inlet port was heated to above 130° C. to avoid condensation of water in the fuel. The copper tubing carrying exhaust fuel out from the test stand was not heated as it was usually at temperatures above 150° C.

The alumina test stand with its four legs was pressure tested to detect any leaks during fabrication. The test station in which the test was conducted was also leak checked to detect any leaks in the plumbing. The PEN was fixed on to an alumina plate with gas entry and exit holes by means of glass-ceramic seals. The anode was placed face down. The furnace was heated at 60° C. per hour to 850° C. in ambient. After the stack reached the desired temperature, a pressure test was conducted on the PEN to detect seal failures. This was done on fuel and air side.

The anode was then exposed to 300 ml/min of hydrogen gas with 4% water. The cathode side was exposed to air at 200 ml/min. The completion of oxide reduction (NiO to Ni) was judged by the stability of open circuit voltage of the stack. A stable OCV of 1.075V for more than an hour indicated completion of anode reduction process. The fuel cell stack was then operated under constant current of 8 A and flow rates of air and hydrogen was adjusted to give 20% fuel and 60% air utilisation. The fuel utilisation was changed to 25% and then to 30% by changing current and hydrogen/air flow rates. Stack was operated on 15% fuel utilisation for sometime. During this time, the water content in the fuel was held at 10%, 20% and 40%. The actual water contents in the fuel were always calculated from the temperature of the water.

The stack was also operated on open circuit with varying amounts of water in the fuel stream. The similarity of the voltage output between the oxygen probe in the inlet and in the exhaust fuel was monitored during this time. This operation was intended to verify that the oxygen probe was working correctly and no air was joining from outside in the exhaust due to hidden failures due to test stand or any other components. With the stack at open circuit, the oxygen probe was used to check the inlet fuel composition which varied with humidification level, this was possible as the fuel is unutilised when the stack is leak free and at open circuit.

The results obtained are shown Table 1 below in the sequence the stack is tested from one utilisation level to another with varying inlet water contents and stack current.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A method of operating a solid oxide fuel cell in which a gaseous supply stream comprising a reactive fuel species is delivered to an anode where the reactive fuel species are consumed in an electrochemical reaction to produce an anode exhaust stream which is depleted in reactive fuel species, and an oxidant supply stream is delivered to a cathode where reactive oxidant species are consumed in an electrochemical reaction to produce a cathode exhaust stream having an oxidant quality, which method comprises:
   predetermining the relationship between a concentration of reactive fuel species in the anode exhaust stream and a maximum current that can be drawn from the fuel cell without redox damage of the anode;
   assessing the concentration of reactive fuel species in the anode exhaust stream by measurement of the oxygen partial pressure of the anode exhaust stream; and
   adjusting the way in which the fuel cell is operated in order to optimize efficiency without oxidation damage of the anode based on the predetermined relationship between the concentration of reactive fuel species in the anode exhaust stream and the maximum current and the assessed concentration of reactive fuel species in the anode exhaust stream.

2. A method according to claim 1, wherein oxidation damage of the anode is avoided by adjusting operation of the fuel cell to reduce the rate of migration of oxygen ions to the anode.

3. A method according to claim 2, wherein operation of the fuel cell is adjusted by reducing the current drawn from the cell and/or by enhancing the fuel quality of the anode exhaust stream thereby increasing the concentration of reactive fuel species available for reaction with oxygen ions.

4. A method according to claim 1, which comprises sampling the cathode exhaust stream and assessing the oxidant quality thereof by comparing its oxygen partial pressure to that of a reference gas.

5. A method according to claim 1 wherein the concentration of reactive fuel species of an exhaust stream is determined by measuring the Nernst voltage of an oxygen sensor in which a reference electrode is exposed to a reference gas and a working electrode to the exhaust stream being sampled.

TABLE 1

Stack performance at various fuel and air utilisation levels.

| Time | flow rate (SLM) | | fuel cell stack | | | fuel inlet sensor | | | fuel exhaust sensor | | | estimated stack | | estimated $U_f$ flow rates | |
| --- | --- | --- | --- | --- | --- | --- | --- | --- | --- | --- | --- | --- | --- | --- | --- |
| Hours | air | fuel | T, °C. | V, V | I, A | T, °C. | water, % | OCV, V | T, °C. | water, % | OCV, V | I, A | $U_f$ | fuel | air |
| 2.76 | 0.201 | 0.301 | 845 | 1.072 | 0.0 | 818 | 3.3 | 1.067 | 827 | — | 1.065 | — | — | — | — |
| 21.01 | 0.221 | 0.279 | 843 | 0.649 | 7.9 | 818 | 5.12 | 1.073 | 826 | 26.24 | 0.982 | 8.9 | 22.3 | 20 | 60 |
| 28.34 | 0.276 | 0.232 | 845 | 0.546 | 9.9 | 819 | 5.30 | 1.071 | 826 | 36.66 | 0.959 | 11.0 | 33.1 | 30 | 60 |
| 44.67 | 0.276 | 0.280 | 844 | 0.479 | 9.9 | 818 | 5.38 | 1.071 | 826 | 32.17 | 0.968 | 11.4 | 28.3 | 25 | 60 |
| 50.52 | 0.222 | 0.280 | 844 | 0.574 | 7.9 | 818 | 5.51 | 1.069 | 826 | 26.27 | 0.982 | 8.8 | 22.0 | 20 | 60 |
| 73.53 | 0.222 | 0.280 | 844 | 0.547 | 7.9 | 818 | 12.9 | 1.026 | 827 | 32.6 | 0.967 | 8.9 | 22.6 | 20 | 60 |
| 75.86 | 0.222 | 0.280 | 844 | 0.661 | 5.9 | 817 | 12.77 | 1.026 | 827 | 28.14 | 0.977 | 7.1 | 17.6 | 15 | 45 |
| 165.20 | 0.222 | 0.280 | 844 | 0.665 | 5.9 | 816 | 24.19 | 0.990 | 826 | 37.79 | 0.957 | 7.2 | 17.9 | 15 | 45 |
| 189.79 | 0.222 | 0.279 | 844 | 0.624 | 5.9 | 814 | 48.16 | 0.941 | 826 | 55.88 | 0.922 | 6.0 | 14.9 | 15 | 45 |
| 196.04 | 0.222 | 0.279 | 844 | 0.945 | 0.0 | 813 | 45.27 | 0.946 | 825 | 45.20 | 0.942 | 0.1 | 0.2 | 0 | 0 |
| 213.04 | 0.222 | 0.279 | 844 | 0.991 | 0.0 | 816 | 23.13 | 0.993 | 826 | 24.61 | 0.986 | 0.8 | 1.9 | 0 | 0 |
| 236.54 | 0.222 | 0.280 | 844 | 1.076 | 0.0 | 818 | 5.06 | 1.073 | 827 | 5.71 | 1.066 | 0.3 | 0.7 | 0 | 0 |
| 268.22 | 0.221 | 0.279 | 844 | 0.611 | 7.9 | 818 | 5.61 | 1.068 | 826 | 26.89 | 0.981 | 9.0 | 22.5 | 20 | 60 |

6. A method according to claim 5, wherein the reference gas is air.

7. A method according to claim 1, which method comprises:
   assessing the oxidant quality of the oxidant exhaust stream;
   relating the oxidant quality of the oxidant exhaust stream to the optimal depletion level according to voltage effects on the fuel cell stack and parasitic pumping losses in provision of oxidant supply and maintaining a safety margin from the maximum current which can be drawn from the fuel cell without reduction damage of the oxidant electrode of the fuel cell; and
   adjusting the current drawn from the fuel cell stack and/or adjusting the oxidant supply stream in order to optimize efficiency of the fuel cell without reduction of the oxidant side electrode based on the relationship between the oxidant quality of the oxidant exhaust stream and the optimal depletion level and the assessed oxidant quality of the oxidant exhaust stream.

* * * * *